United States Patent
Busse et al.

(10) Patent No.: US 6,894,283 B1
(45) Date of Patent: May 17, 2005

(54) SENSOR MATRIX

(75) Inventors: Falko Busse, Aachen (DE); Michael Overdick, Bonn (DE); Walter Rütten, Linnich (DE); Martin John Powell, Horley (GB)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 09/743,656
(22) PCT Filed: May 17, 2000
(86) PCT No.: PCT/EP00/04607
   § 371 (c)(1),
   (2), (4) Date: Jun. 7, 2001
(87) PCT Pub. No.: WO00/70864
   PCT Pub. Date: Nov. 23, 2000

(30) Foreign Application Priority Data

May 18, 1999 (DE) .......................... 199 22 650

(51) Int. Cl.⁷ ................................. G01T 1/24
(52) U.S. Cl. ...................... 250/370.09; 250/370.07
(58) Field of Search .................. 250/370.09, 370.07

(56) References Cited

U.S. PATENT DOCUMENTS

| 5,017,989 A | * | 5/1991 | Street et al. ............... 257/291 |
| 5,184,018 A | * | 2/1993 | Conrads et al. ......... 250/370.09 |
| 5,194,736 A | * | 3/1993 | Meulenbrugge et al. .............. 250/370.07 |
| 5,198,673 A | * | 3/1993 | Rougeot et al. ....... 250/370.11 |
| 5,770,871 A | * | 6/1998 | Weisfield ................... 257/232 |

FOREIGN PATENT DOCUMENTS

EP        0440282 A2    8/1991    ............... 3/15

* cited by examiner

Primary Examiner—David Porta
Assistant Examiner—Faye Polyzos

(57) ABSTRACT

The invention relates to an arrangement with light-sensitive or X-ray-sensitive sensors which are arranged in rows and columns of a matrix and generate charges in dependence on the amount of incident radiation, each sensor including a photosensor element with an intrinsic storage capacitor and/or a storage capacitor connected parallel to its terminals, and also a respective transistor; it also includes at least one switching line for each row of sensors via which the transistors can be activated so that the charges of the relevant activated sensors S can be read out simultaneously via read-out lines 8 in order to ensure that, in conformity with the relevant mode of operation of the arrangement, the switching noise caused by the reading out of the sensors is reduced and/or a higher image repeat rate or more stable operating conditions for the photosensor element, also in the case of large signals, as well as an increase of the dynamic range of the photosensor element become possible in that each sensor S includes a further transistor 5 which is connected directly to the photosensor element 1 and can be activated via at least one control line, both transistors 3, 5 of each sensor S being connected in series and an electrode of a further capacitor 4 being connected to the junction of the two transistors 3, 5.

9 Claims, 3 Drawing Sheets

SENSOR MATRIX

The invention relates to an arrangement which includes light-sensitive or X-ray-sensitive sensors which are arranged in a matrix of rows and columns and generate charges in dependence on the amount of incident radiation, each sensor including a respective photosensor element with an intrinsic storage capacitance or a storage capacitor connected parallel to the terminals thereof, as well as with a respective transistor, for each row of sensors there being provided at least one switching line via which the transistors can be activated so that the charges of the relevant activated sensors S can be read out simultaneously via read-out lines 8. The invention also relates to a method for operating the arrangement.

An arrangement of the kind set forth is known from EP 0 440 282 A2. Only small X-ray doses are incident on the sensors, notably in the case of X-ray applications. Consequently, the electrical charge generated in the photosensor elements in dependence on the incident radiation is also very small. The small amounts of charge often give rise to problems, because a large amount of noise is superposed on the signal read out. In order to mitigate this problem, the single sensor of the arrangement disclosed in EP 0 440 282 A2 has an as large as possible sensitive surface area in order to enhance the radiation sensitivity. In order to realize such large surfaces areas, each read-out line of the matrix is provided with only one amplifier which serves to amplify the signals read out from all sensors of this column.

It is an object of the invention to provide an improved arrangement of the kind set forth and to propose a method for operating said arrangement. More specifically, depending on the mode of operation of the arrangement, the switching noise caused by the reading out of the sensors should be reduced and/or a higher image repeat rate, more stable operating conditions of the photosensor element, also in the case of large signals, as well as an increased dynamic range of the photosensor element should be possible.

The described object is achieved on the basis of the idea to provide a further transistor which can be driven independently of the first transistor and co-operates with an additional capacitor in each sensor.

More specifically, the object is achieved in an arrangement of the kind set forth in that each sensor includes a further transistor which is connected directly to the photosensor element and can be activated via at least one control line, that the two transistors of each sensor are connected in series, and that an electrode of a further capacitor is connected to the junction of the two transistors.

Both transistors of the sensor in a preferred embodiment of the invention are constructed as field effect transistors whose conductive channels are connected in series. Different modes of operation of the arrangement can be realized in dependence on the driving of the gate terminal of the field effect transistor connected to the photosensor element via the control line (control field effect transistor). The individual modes of operation follow from the method for operating the arrangements according to the invention as disclosed in the claims 6 to 8.

The gate terminal of the field effect transistor (switching field effect transistor) which is connected in series with the control field effect transistor is connected in known manner to the switching line which is activated so as to read out the sensor.

In conformity with the known switching lines, for each row of sensors there may be provided at least one control line for controlling the further transistors, notably the control field effect transistors. However, it is alternatively possible to provide only one control line for driving all further transistors of the entire matrix.

For an effective reduction of the switching noise of the switching field effect transistor, in an embodiment of the invention the further capacitor is selected to be smaller than the intrinsic capacitance and/or the storage capacitor connected parallel to the photosensor element.

The constituent elements of each sensor can be arranged adjacently and/or one above the other on a thin-film substrate. The additional control field effect transistor may consist of amorphous silicon or polycrystalline silicon.

When the arrangement according to the invention operates in conformity with the characteristics of claim 6, a continuous charge transfer to the further capacitor is achieved. When the voltage across the photosensor element is kept constant, the further capacitor is discharged instead of the storage capacitor when radiation is incident on the photosensor element. The term "charge pump" will be used hereinafter for this mode of operation of the control field effect transistor. Consequently, the further capacitor is charged again during the reading out via the read-out line. When the further capacitor is smaller than the storage capacitor, the switching noise which is proportional to the magnitude of the capacitor read out is reduced.

Because the voltage across the photosensor element is kept constant, the operation of the photosensor element is stable even in the case of large signals, because it continuously operates at the same working point. Moreover, a larger dynamic range of the sensor is obtained when the maximum voltage swing across the further capacitor is suitably chosen.

Controlled charge transfer between the storage capacitor and the further capacitor can be achieved by operation of the arrangement according to the invention in conformity with the characteristics of claim 7. In such a mode of operation the charge is read out from the further capacitor while the radiation incident on the photosensor already produces new charges in the storage capacitor. To this end, the control field effect transistor temporarily operates as a charge pump.

The further capacitor, being smaller than the storage capacitor, exerts a reducing effect on the switching noise of the switching field effect transistor also in the case of controlled charge transfer. Because of the temporal overlap of the charge integration across the storage capacitor and the reading out of the further capacitor, this mode of operation allows for image repeat rates which are higher than can be achieved in arrangements known thus far.

In a mode of operation of the arrangement according to the invention in conformity with the characteristics of claim 8, the storage capacitor is effectively enlarged by the further capacitor. The presence of a given bias voltage across the photosensor element, notably a photodiode, increases the dynamic range thereof.

Further features and advantages of the inventions disclosed herein will be explained with reference to the appended drawings.

An embodiment of the invention will be described in detail hereinafter with reference to FIG. 1 which shows a part of a sensor matrix.

Figure 1:
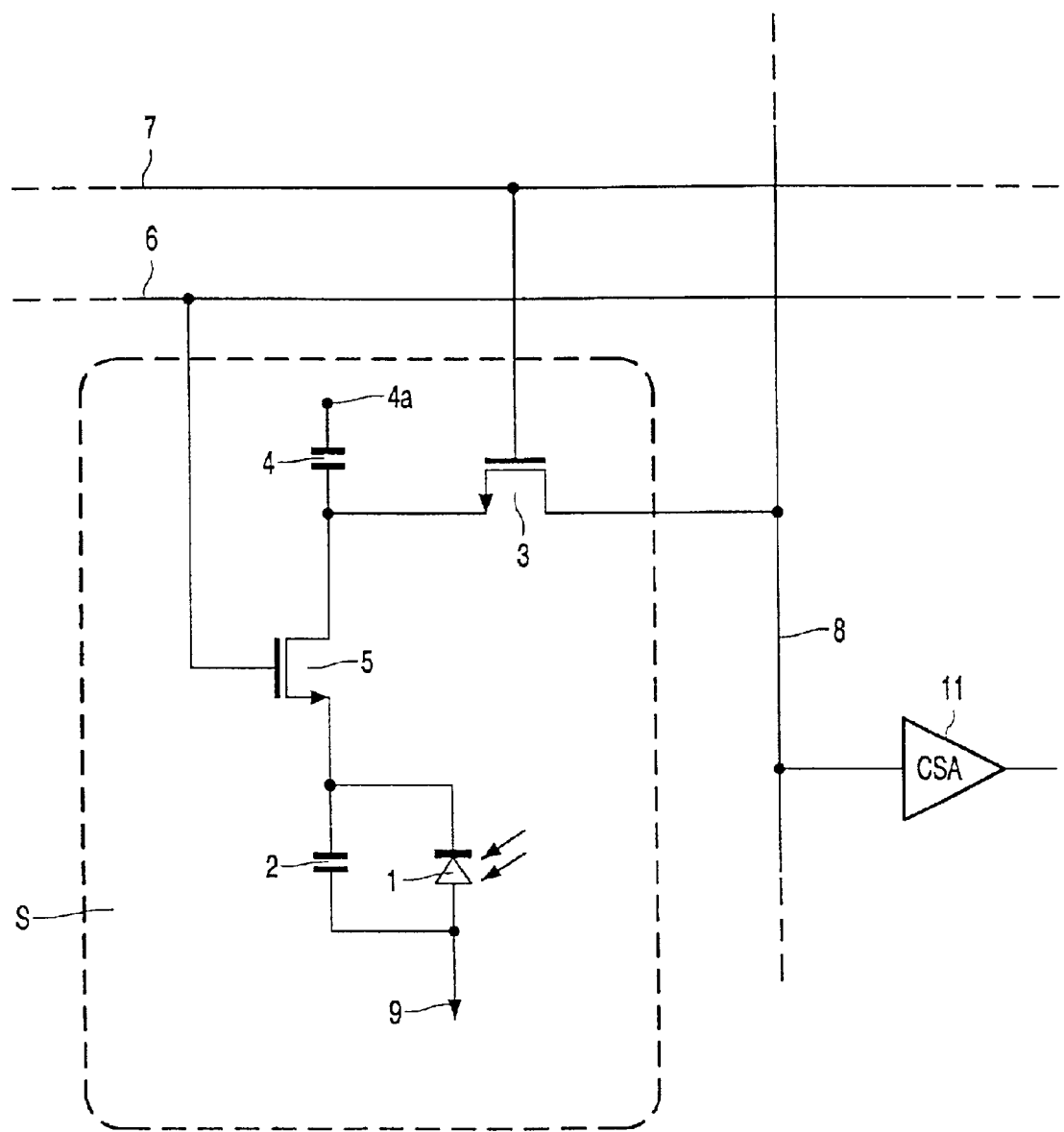
FIG. 1 is a circuit schematic diagram showing a partial arrangement of one embodiment of the sensor of the invention.
Figure 2:
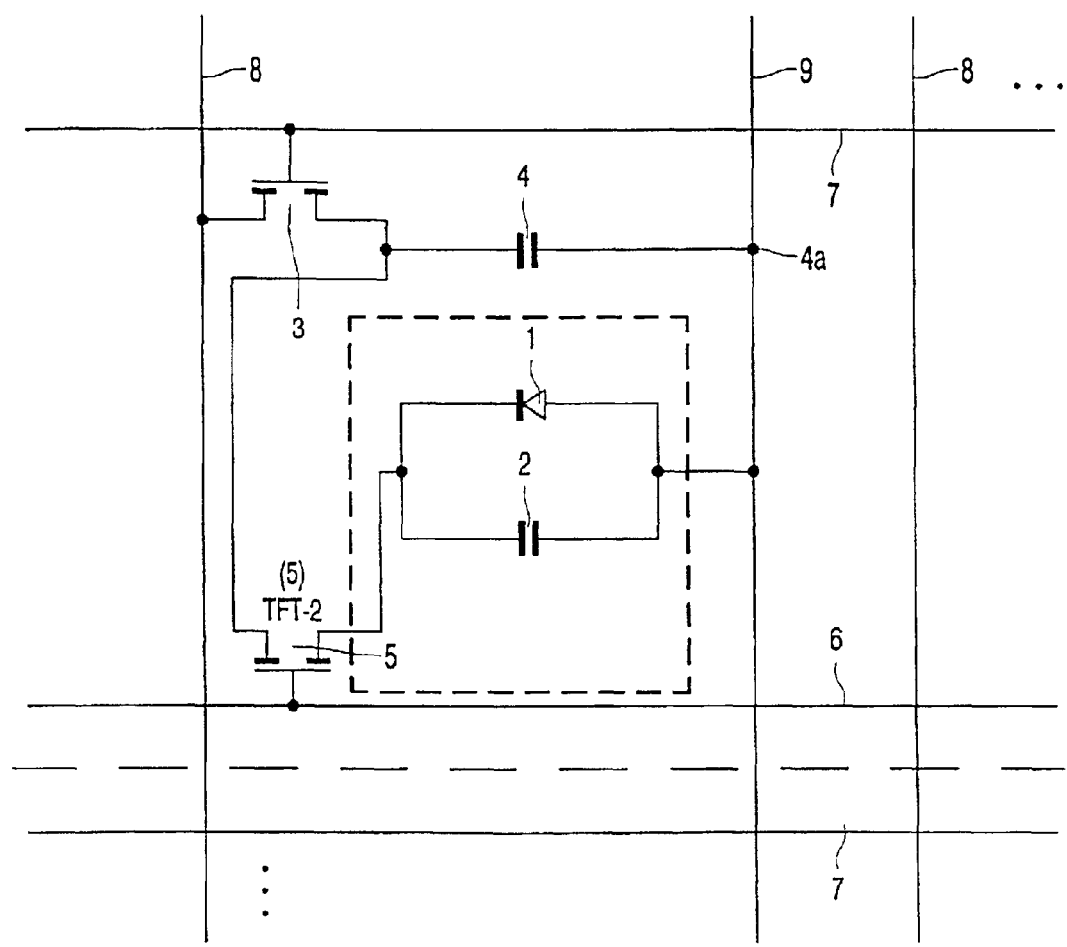
FIG. 2 is a circuit schematic diagram of a second embodiment of a sensor arrangement of the invention.
Figure 3:
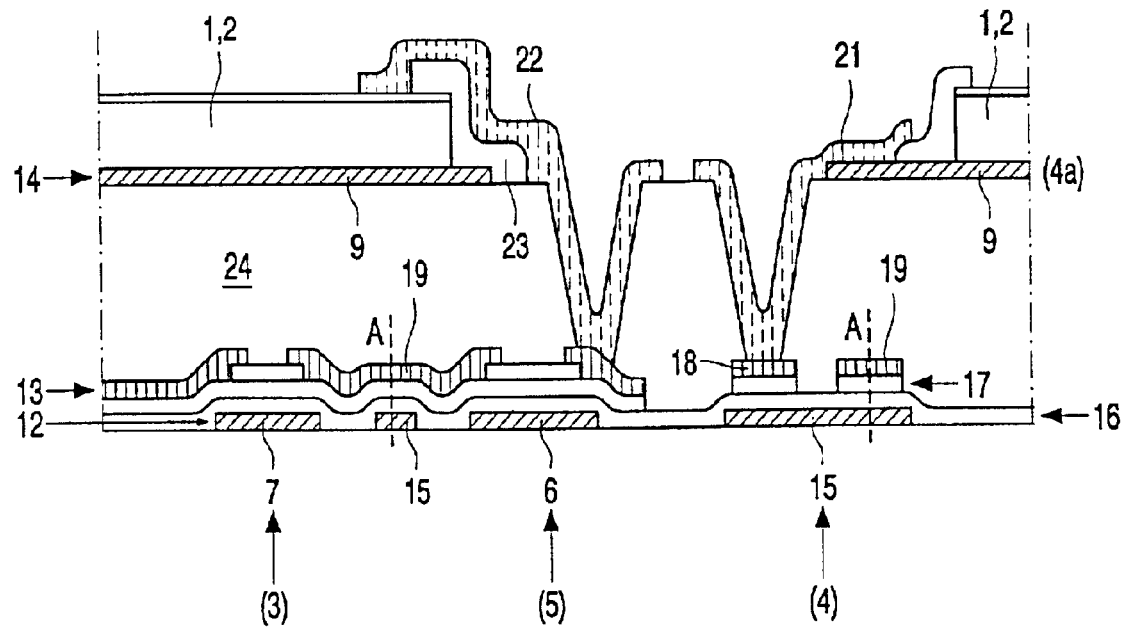
FIG. 3 is a cross sectional view of a sensor matrix of the invention.
Figure 4:
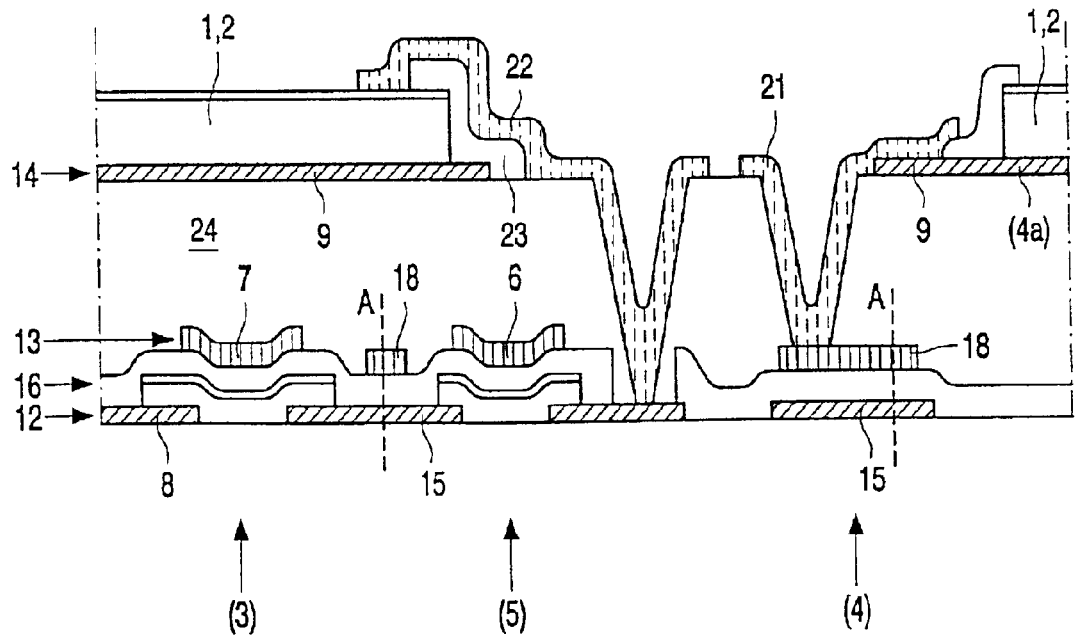
FIG. 4 is a cross sectional view of a sensor matrix of the invention that is a variation on the sensor matrix highlighted in FIG. 3.

FIG. 1 shows merely a part of an arrangement according to the invention with only one radiation-sensitive sensor S. All sensors of this embodiment are provided with n-channel field effect transistors. Evidently, field effect transistors having a different construction can also be used in the context of the invention.

A matrix consists in known manner of a multitude of, for example 2000×2000 sensors S which are arranged in rows and columns. The respective first sensors S of a row of the matrix together form the first column whereas the respective second sensors of each row together constitute the second column, etc.

Each sensor S includes a photosensor element. When suitable semiconductors are used, the photosensor element itself may already be sensitive to X-rays. However, it may also be a light-sensitive photodiode 1 which receives light whenever X-rays are incident on a scintillator layer arranged thereabove. In the absence of a scintillator layer the arrangement is also suitable for the direct detection of light. Parallel to the terminals of the photodiode 1 there is connected a storage capacitor 2. The anode of the photodiode 1 and an electrode of the storage capacitor 2 are connected to a common electrode 9 which biases it with a negative DC voltage. The cathode of the photodiode 1 and the other electrode of the storage capacitor 2 are connected to a source terminal of a control field effect transistor 5. The drain terminal of the control field effect transistor 5 in its turn is connected to a source terminal of a switching field effect transistor 3.

When radiation is incident on the photodiode 1, charge carrier pairs (charges) are generated in the photodiode 1, with the result that the charged storage capacitor is partly discharged. The discharge is dependent on the number of photons incident on the photodiode 1. Each sensor can be individually read out by compensating the respective charge deficiency via the conductive channels of the field effect transistors 3, 5. To this end, a control line 6 and a switching line 7 are provided for each row of the sensor matrix. The switching line 7 is connected to the gate terminals of the switching field effect transistors 3 and the control line is connected to the gate terminals of the control field effect transistors 5 of the sensors S.

The switching and control lines 6, 7 thus activate the field effect transistors 3, of the associated row of the matrix. They are driven, for example by means of a driver circuit which is known per se and not shown in the Figure, said driver circuit applying different analog control voltages to the lines 6, 7. The driver circuit serves to activate the rows of the sensor matrix successively in order to read out the charges stored in the sensors S.

A read-out line 8 is provided in known manner for each column of the matrix. All read-out lines 8 are connected to the drain terminals of the switching field effect transistors 3 of the sensors of the relevant column. An amplifier 11 is regularly associated with each read-out line 8, said amplifier integrating the charges row-wise flowing in the individual sensors S. The amplifiers 11 are preceded by an analog multiplexer (not shown) whose inputs are connected to the outputs of the amplifiers. The analog multiplexer converts the charges, arriving simultaneously and in parallel from each time one row of the matrix, into a serial signal which is presented on a serial output of the analog multiplexer so as to be processed further.

An electrode of a further capacitor 4 is connected to the drain terminal of the control field effect transistor 5 and the source terminal of the switching field effect transistor 3, respectively, the other electrode 4a of said further capacitor also being connected to the general electrode 9 or a general electrode which is independent therefrom. In the context of the invention it is possible to insert one or more cascode transistors in the connection between the control field effect transistor 5 and the switching field effect transistor 3 of each sensor S in order to stabilize the drain voltage across the control field effect transistor 5.

In conjunction with the control field effect transistor 5, whose gate terminal is driven via the control line 6, the further capacitor 4 enables the following modes of operation for the individual sensors S of the arrangement according to the invention:

A. Continuous Charge Transfer

When a suitable voltage is applied to the gate terminal of the control field effect transistor 5 via the control line 6, this transistor can operate as a charge pump. A suitable voltage is a voltage which causes the control field effect transistor 5 to operate in the saturation range. The voltage present across the photodiode 1 and the storage capacitor 2 is thus kept constant.

When radiation is incident on the photodiode 1 in this mode of operation of the sensor S, the storage capacitor 2 of the photodiode 1 is no longer discharged, but the further capacitor 4 is discharged. When the switching field effect transistor 3 is then closed for the purpose of reading out, the further capacitor 4 is charged again during the reading out of the charge via the read-out line 8.

B. Controlled Charge Transfer

The charge transfer from the further capacitor 4 to the storage capacitor 2 is governed by the voltage on the control line 6. On the basis of this relationship it is possible to inhibit the charge transfer described sub A in given phases of the image data acquisition by applying a negative voltage (in relation to the voltage at the source terminal) to the gate terminal of the field effect transistor 5, via the control line 6, so that the control field effect transistor 5 is turned off.

When the charge transfer is inhibited, first only the storage capacitor 2 is discharged and subsequently it is charged again from the further capacitor 4. The compensation of the charge across the further capacitor 4 via the activated switching field effect transistor 3 and the read-out line 8 can then take place when radiation is already incident again on the photodiode 1 and the capacitor 2 is discharged.

C. Increasing the Storage Capacitor

When a large positive voltage, in comparison with the voltage at the source terminal, is applied to the gate terminal of the control field effect transistor 5, the channel thereof becomes conductive. When this voltage is sustained, a continuous connection is established between the storage capacitor 2 and the further capacitor 4. The overall capacitance connected parallel to the photodiode 1 is thus increased by the additional capacitance 4. The dynamic range of the photodiode 1 can thus be increased for a given bias voltage.

What is claimed is:

1. An arrangement which includes light-sensitive or X-ray-sensitive sensors (S) which are arranged in a matrix of rows and columns and generate charges in dependence on the amount of incident radiation, each sensor (S) including a respective photosensor element (1) with an intrinsic storage capacitance and/or a storage capacitor (2) connected parallel to the terminals thereof, as well as with a respective transistor (3), for each row of sensors there being provided at least one switching line (7) via which the transistors (3) can be activated so that the charges of the relevant activated sensors (S) can be read out simultaneously via read-out lines (8), characterized in that each sensor (S) includes a further transistor (5) which is connected directly to the photosensor element (1) and can be activated via at least one control line (6), that the two transistors (3, 5) of each sensor (S) are connected in series, and that an electrode of a further capacitor (4) is connected to the junction of the two transistors (3, 5).

2. An arrangement as claimed in claim 1, characterized in that the further transistors (5) can be activated via at least one control line (6) per row of sensors or one control line for the entire matrix.

3. An arrangement as claimed in claim 2, characterized in that both transistors (3, 5) of each sensor are constructed as field effect transistors whose conductive channels are connected in series, the gate terminal of the control field effect transistor (5) connected to the photosensor element (1) being connected to the control line (6) whereas the gate terminal of the series-connected switching field effect transistor (3) is connected to the switching line (7).

4. An arrangement as claimed in claim 1, characterized in that the further capacitor (4) is smaller than the storage capacitor (2).

5. An arrangement as claimed in claim 3, characterized in that the constituent elements of the sensor (5) are arranged one above the other and/or adjacent one another on a thin-film substrate.

6. A method for operating an arrangement as claimed in claim 3, characterized in that the voltage present at the gate terminal of the control field effect transistor (5) of each sensor (S) is chosen to be such that it keeps the voltage across the photosensor element (1) constant and hence operates as a charge pump.

7. A method for operating an arrangement as claimed in claim 3, characterized in that the conductive channel of the control field effect transistor (5) of each sensor (6) is blocked during the charge integration in the storage capacitor (2) of the radiation incident on the photosensor element (1), and that the charge is subsequently transferred to the further capacitor (4) by the unblocking of the conductive channel and is subsequently read out therefrom by the unblocking of the conductive channel of the switching field effect transistor (3).

8. A method for operating an arrangement as claimed in claim 3, characterized in that the voltage, present at the gate terminal of the control field effect transistor (5), of each sensor (S) is chosen to be so high that the conductive channel thereof directly connects the storage capacitor (2) to the further capacitor (4).

9. The use of the arrangement claimed in claim 1 in an X-ray examination apparatus.

\* \* \* \* \*